United States Patent [19]

Heink et al.

[11] Patent Number: 5,157,535

[45] Date of Patent: Oct. 20, 1992

[54] MONOLITHIC OPTICAL SCANNER

[75] Inventors: Philip J. Heink; Daniel L. Huber; Wilson M. Routt, Jr.; Scott S. Williams, all of Lexington, Ky.

[73] Assignee: Lexmark International, Inc., Greenwich, Conn.

[21] Appl. No.: 827,665

[22] Filed: Jan. 29, 1992

[51] Int. Cl.$^5$ .................. G02B 26/08; G02B 13/18
[52] U.S. Cl. .................. 359/216; 359/206; 359/662; 359/720
[58] Field of Search ........... 359/205, 206, 216, 720, 359/662

[56] References Cited

U.S. PATENT DOCUMENTS

| | | | |
|---|---|---|---|
| 4,277,128 | 7/1981 | Kawamura | 359/206 |
| 4,847,492 | 7/1989 | Houki | 250/235 |
| 4,917,483 | 4/1990 | Nakao | 350/423 |
| 5,009,472 | 4/1991 | Morimoto | 350/6.5 |
| 5,111,325 | 5/1992 | DeJager | 359/206 |

Primary Examiner—Bruce Y. Arnold
Assistant Examiner—James Phan
Attorney, Agent, or Firm—John A. Brady

[57] ABSTRACT

An optical system having a single, monolithic scan element as shown in the drawing in which surface 6 is concave, surface 7 is convex, surface 8 is convex, surface 9 is convex and the circumference of surface 9 is convex, surface 10 is convex, surface 11 is convex, and surface 13 is flat. f-theta correction is made primarily at surfaces 6, 9, 10 and 13. The element is molded from optical grade plastic and provides improved performance, no assembly adjustment, performance enhancement from its complex surfaces, and low cost.

2 Claims, 2 Drawing Sheets

MONOLITHIC OPTICAL SCANNER

TECHNICAL FIELD

This invention relates to optical beam scanners, specifically to the optical system by which a dynamically reflected light-beam is trained on to a surface accurately and with compensation for nonlinearities, specifically f-theta distortion.

BACKGROUND OF THE INVENTION

In the common optical scanning system upon which this invention improves, a light beam is deflected by a facet of a rotating mirror and the light from the mirror is directed by an optical system of lenses and reflectors to a photoconductive surface. The light beam is modulated, typically by off and on modulation, to apply an image to the photoconductive surface. The optical system must direct and focus the light.

Since the mirror is rotated at constant speed and the modulation interval is constant, a distortion is experienced known as f-theta distortion. This results in points on a plane surface being scanned having varied spacing over the scanned length.

This invention provides a highly stable, accurate, and cost effective optical system which also corrects f-theta distortion. The following United States patents are illustrative of this technology, but are not to a monolithic optical scanner: U.S. Pat. Nos. 5,009,472 to Morimoto; 4,917,483 to Nakao and 4,847,492 to Houk.

DISCLOSURE OF THE INVENTION

A single, monolithic scan element as shown in FIGS. 1, 2 and 3 in which surface 6 is concave to produce divergence in one direction, surface 7 is convex to reduce divergence in a direction orthogonal to said one direction, surface 8 is convex to further reduce divergence in the orthogonal direction, surface 9 is convex and the circumference of surface 9 is convex, which stops divergence in the orthogonal direction and starts convergence in the one direction, surface 10 is convex to give convergence in the one direction, surface 11 is convex to give convergence in the orthogonal direction. Surface 13 is flat. Correction for f-theta is made in stages, primarily at surfaces 6, 9, 10 and 13.

This element is moldable in optical grade plastics and provides improved performance, no assembly adjustment, and low cost. The invention has the potential of providing additional performance enhancement by employing more complex surfaces that those of the preferred embodiment.

BRIEF DESCRIPTION OF THE DRAWING

This invention will be described in connection with the accompanying drawing, in which.

BEST MODE FOR CARRYING OUT THE INVENTION

The drawings show the outlines of the monolithic scan element in scale, but do not attempt to show surface curvatures in scale. As previously described, lack of f-theta correction results in the effect of light points distributed on a plane surface having variable spacing when they are made by light beams created at regular time intervals and reflected from a plane surface turning at constant angular velocity.

Element 20 is a complex, monolithic optical element which provides a high performance, low cost optical line scanner for use in electrophotographic printers. Element 20 is moldable from acrylic resins and other optical grade plastics.

Figure 1:
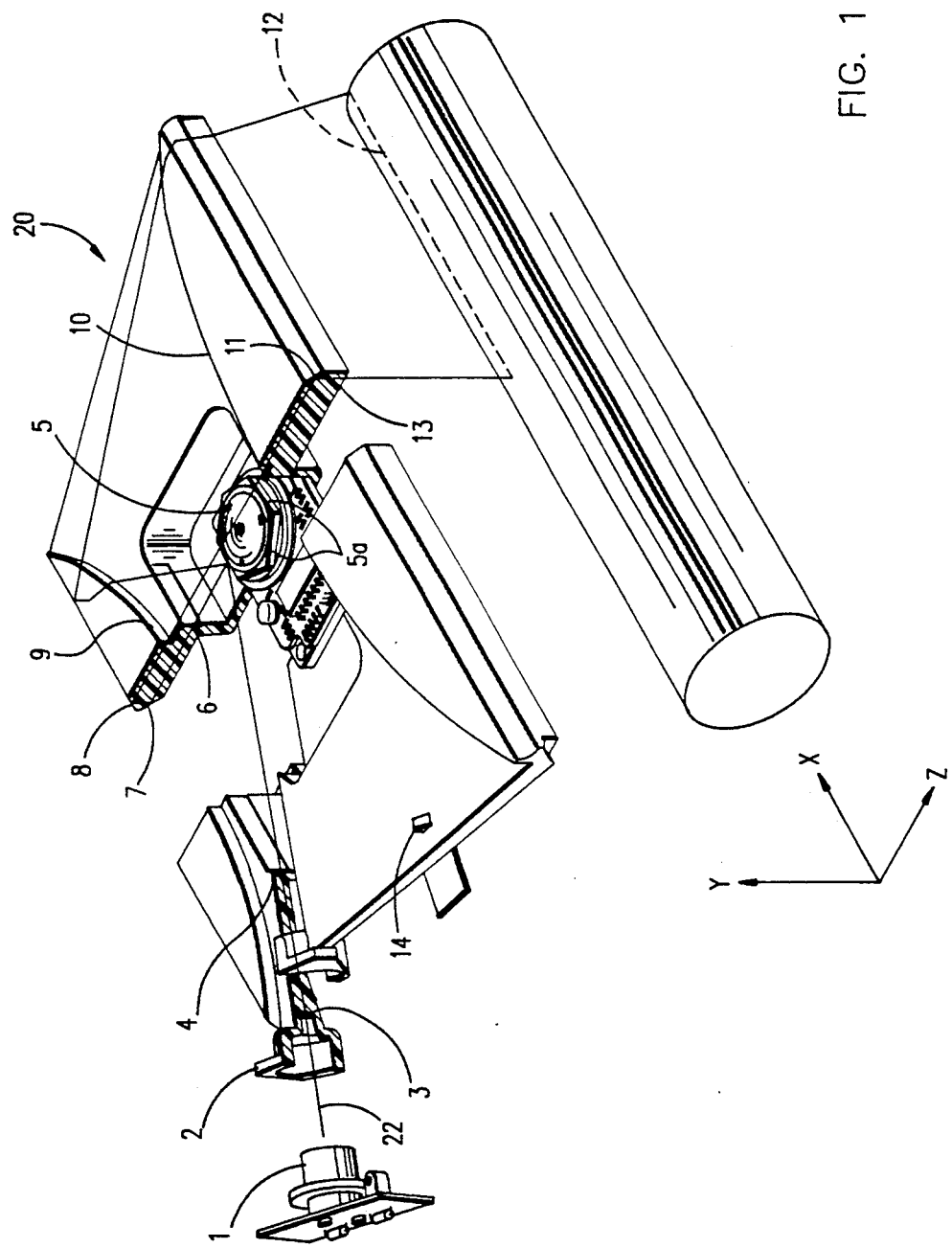
FIG. 1 is perspective, partially cross-sectioned view of the light system and associated elements.
Figure 2:
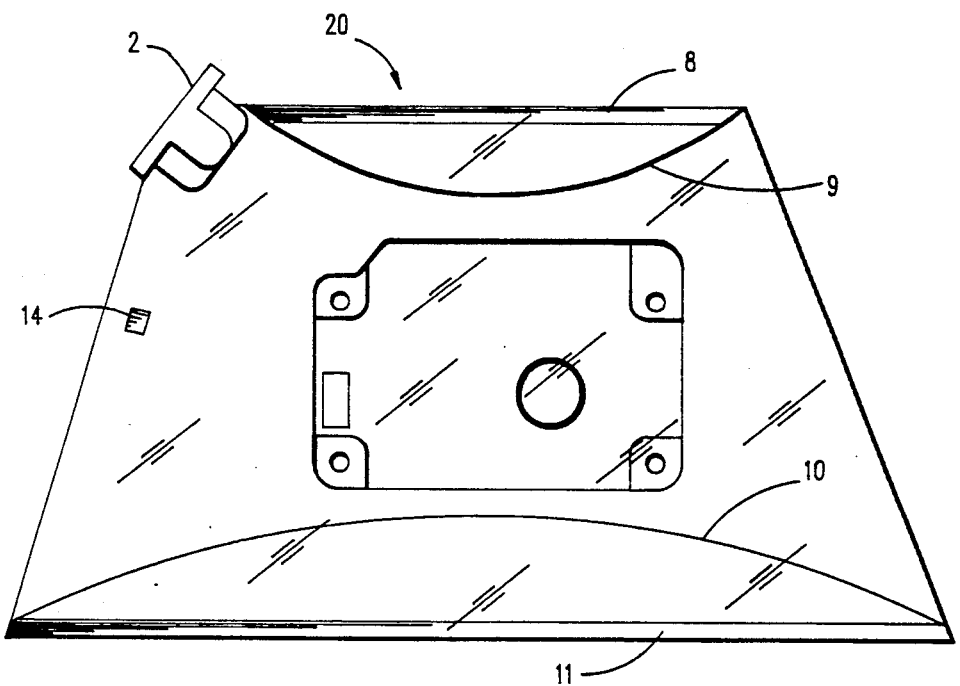
FIG. 2 is a top view of the monolithic scan element.
Figure 3:
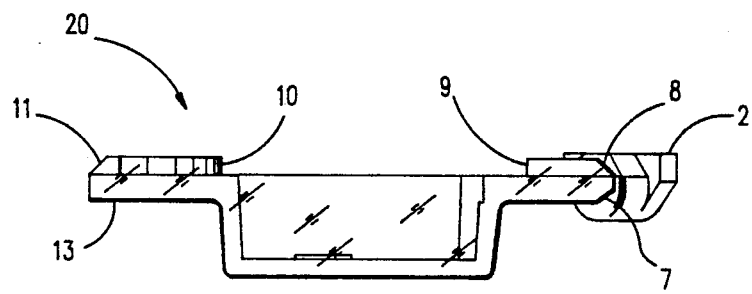
FIG. 3 is a side view of the monolithic scan element.

A view of an optical printhead utilizing optical element 20 is shown in FIG. 1. A beam of light 22, in this case produced by a laser diode module 1 attached to the printhead at 2, enters the optical system at lens surface 3. The beam is likely to be nearly collimated and to have cross sections in the y direction and in the x-z plane determined by an aperture (not shown) positioned in the light path. In any case, the beam is further conditioned in size and divergence rate in the y direction by a meniscus lens comprised of surfaces 3, 4 and the intervening material. (Simultaneous conditioning of beam properties in the orthogonal cross section is readily possible.)

Angular deflection of the conditioned beam 22 is accomplished with a rotating mirror 5 interposed in the beam path and having planar reflecting surfaces 5a. Mirrors, shown illustratively as having six reflecting surfaces 5a, direct beam 22 toward surface 6 of monolithic element 20, the first of seven surfaces together designed to provide for suitably constant print element spacing (f-theta correction), uniform print element size and cross-sectional shape, and compensation for variations in orientation of mirror 5 rotational axis and/or reflecting surface 5a normals. The position and shape of individual surfaces in element 20 is dependent on mechanical design constraints and on sensitivity and optimization considerations.

For the particular design depicted, surface 6 is a slightly concave cylinder, radius about 1.48 meters, with its axis of symmetry in the y direction. This surface provides slightly more than one half of the needed f-theta correction and allows control of beam divergence in the x-z plane cross section. The latter function is important in setting final beam 22 size at the point of printing. Surface 7 and surface 8 act primarily to provide a retro-reflection of the beam by meeting the conditions for total internal reflection. Surfaces 7 and 8 are concave cylinders (with respect to the beam) with their axes of symmetry in the z direction. The radii of curvature, about 1.2 meters, act to reduce the divergence rate of the beam in the y cross section. The purpose of the retro-reflection is to effectively lengthen the optical path to compensate for the low (n=1.486 . . .) index of refraction of the acrylic material used. Surface 9 is toroidal, having different radii of curvature in the y-z and x-z planes. for this design, the y-z plan radius is 41.5 millimeters and the x-z plane radius is 74.7 millimeters. Surface 9 acts primarily to asymmetrically alter beam divergence rates and thus to affect final beam 22 size and shape at printing. Surface 9 also has a significant effect on print line length and f-theta compensation. In addition, this compound surface provides an interaction between y and x-z cross sectional divergence rates which decouples the effect of reflecting surface 5a tilt compensation from print element size.

The interaction with surface 9 nearly collimates the y cross section of the beam, and begins a convergence of the x-z cross section. Surface 10 is a cylinder with its axis of symmetry in the y direction, and a radius of curvature of 246.2 millimeters for this design. This surface increases the convergence rate of the x-z cross section of the beam with little effect on the y cross section. f-theta compensation is slightly over-corrected by this surface to accommodate the effect of the flat exit surface 13. Final print element size on the exposed surface 12 and in the z direction is set by surfaces 11 and 13. Surface 11 is cylindrical with a radius of 220 millimeters for this design, and with its axis of symmetry in the x direction. Interaction with this surface meets conditions for total internal reflection.

Drum 12 is a photoconductive drum which is illuminated by the optical system by off and on modulation of beam 22. Beam 22 is moved along drum 12 in the direction of the x axis. The scan direction is defined as the direction along the x axis of drum 12. The process direction is defined as the direction tangent to the surface of drum 12, which is parallel to the z axis and orthogonal to the x axis. The photoconductive drum turns at a constant speed around its center axis, which is parallel to the x axis.

The initial beam 22 spot from laser 1 measures 0.8 mm in the process direction by 2.0 mm in the scan direction. The final spot on drum 12 is 0.09 mm in the process direction by 0.07 mm in the scan direction.

Beam 22 enters the solid at surface 3, which is convex around the z axis. Which makes the beam more elliptical.

Beam 22 exits the solid at surface 4, which is concave around z, which reduces the convergence produced by surface 3.

Beam 22 is reflected by surface 5 and enters solid at surface 6, which is concave around y, which produces divergence in the scan direction.

Surface 7 is convex around x, which reduces divergence in the process direction.

Surface 8 is convex with the same radius as surface 7, which further reduces divergence in the process direction.

Beam 22 exits the solid at surface 9, which is convex around y and convex around its circumference, which stops process divergence and starts scan convergence.

Beam 22 enters solid at surface 10, which is convex around y, which increases scan convergence.

Surface 11 is convex around x, which provides final process direction convergence. And, The beam exits at flat surface 13.

As an incident of this operation, f-theta is corrected in stages, primarily by refraction at surfaces 6, 9, 10, and 13.

Provision for synchronizing the start location of adjacent scan lines is made by supplying an optical path to a beam detector (indicated as 14). This optical path and sensor cause an electronic signal to be generated as the beam crosses a predetermined point a fixed distance/time from the desired start of the printed line. One method involves returning beam 22 to a sensor (not shown) resident in the beam source 1 via the prescan optics, lenses 2 and 3. This method makes use of reflection of the beam from the scan mirror 5 as a reflecting surface 5a normal approaches the incident beam 22 direction, the reflected beam then passes back through the prescan lenses 2 and 3 into the source housing, and strikes the sensor which is resident in the beam source. A second method of providing beam detection for scan start synchronization is to mold an appropriately oriented reflecting (total internal reflection) surface onto or near the end of the exit surface (13) to retro-reflect the beam toward a sensor placed within or on the surface of the molded part. This allows optical distance from the scan mirror to the beam sensor to closely approximate or exceed that to the print line, thus allowing accurate beam position determination.

The disclosed embodiment features a monolithic optical element 20 moldable from optical grade plastics with current technologies, capable of providing a high quality scan line when used with available scan mirrors and beam sources. The use of low index of refraction materials is compensated by folding the longer optical path using totally internally reflecting surfaces. These surfaces are also used to alter beam divergence rates. A high degree of correction for scan mirror rates. A high degree of correction for scan mirror reflecting surface misorientation is provided by making the mirror facet 5a and print line optical conjugates in the process direction via surfaces 6, 7, 8, 9, 10, 11 and 13. Although the specific design detailed here uses surfaces with singly or doubly constant radii of curvature, the molding process lends itself well to some surfaces with continuously variable radii The present and future advantages of this approach include;

1. improved performance at lower cost,
2. elimination of adjustments during assembly, and
3. potential for performance enhancement at low cost using more complex surfaces.

In implementation, to mold element 20, element 20 is designed to have a nearly constant thickness to provide a uniform cooling and therefore more accurate and consistent results. This gives the element 20 a bulge around the bottom, and does not change the optical surfaces, which are on the top.

Although the mirror surfaces 5a of this embodiment are flat, in other designs they could be shaped to achieve optical effects which participate in an optical system as a whole as described in application.

We claim:

1. A monolithic optical scan element having a first surface, said first surface being concave to produce divergence in one direction, a second surface in the optical path following said first surface, said second surface being convex to reduce divergence in a direction orthogonal to said one direction, a third surface in the optical path following said second surface, said third surface being convex to reduce divergence in said orthogonal direction, a fourth surface in the optical path following said third surface, said fourth surface being convex and the circumference of said fourth surface being convex to stop divergence in said orthogonal direction and start convergence in said one direction, a fifth surface in the optical path following said fourth surface, said fifth surface being convex to produce convergence in said one direction, a sixth surface in the optical path following said fifth surface, said sixth surface being convex to give convergence in said orthogonal direction, a seventh surface in the optical path following said sixth surface, said seventh surface being flat and refractive; and said surfaces, including at least said first surface, said fourth surface, said fifth surface and said seventh surface being corrective of f-theta distortion.

2. An optical system comprising the optical scan element of claim 1, a light source, a rotatable reflector with a plurality of facets, means to direct light from said light source to said reflector to be reflected to said first surface, and a photosensitive element positioned to receive the light output of said seventh surface.

* * * * *